US006507841B2

(12) United States Patent
Riverieulx de Varax

(10) Patent No.: US 6,507,841 B2
(45) Date of Patent: Jan. 14, 2003

(54) METHODS OF AND APPARATUS FOR REFINING DESCRIPTORS

(75) Inventor: Aymeric Riverieulx de Varax, Caluire (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/252,671

(22) Filed: Feb. 19, 1999

(65) Prior Publication Data

US 2002/0083031 A1 Jun. 27, 2002

(30) Foreign Application Priority Data

Feb. 20, 1998 (EP) .............................................. 98301261
Nov. 25, 1998 (GB) .............................................. 9825662

(51) Int. Cl.[7] .............................................. G06F 17/30
(52) U.S. Cl. ..................... 707/5; 707/2; 707/4; 707/200
(58) Field of Search ............................... 707/200, 2, 3, 707/4, 5

(56) References Cited

U.S. PATENT DOCUMENTS

| | | | | |
|---|---|---|---|---|
| 5,020,019 A | * | 5/1991 | Ogawa .......................... 364/900 |
| 5,168,565 A | * | 12/1992 | Morita .......................... 395/600 |
| 5,493,677 A | * | 2/1996 | Balogh et al. ............... 395/600 |
| 5,535,382 A | * | 7/1996 | Ogawa .......................... 395/600 |
| 5,642,502 A | | 6/1997 | Driscoll |
| 5,696,964 A | * | 12/1997 | Cox et al. ..................... 395/605 |
| 5,761,496 A | | 6/1998 | Hattori |
| 5,781,175 A | * | 7/1998 | Hara ............................ 345/127 |
| 5,787,421 A | * | 7/1998 | Nomiyama .................... 707/5 |
| 5,890,152 A | * | 3/1999 | Rapaport et al. ............. 707/6 |
| 6,006,222 A | | 12/1999 | Culliss .......................... 707/5 |
| 6,014,665 A | | 1/2000 | Culliss .......................... 707/5 |
| 6,044,365 A | * | 3/2000 | Cannon et al. ................ 707/2 |
| 6,078,916 A | | 6/2000 | Culliss .......................... 707/5 |
| 6,084,595 A | * | 7/2000 | Bach et al. ................... 345/431 |
| 6,182,068 B1 | | 1/2001 | Culliss .......................... 707/5 |
| 6,247,009 B1 | * | 6/2001 | Shiiyama et al. ............. 707/3 |

FOREIGN PATENT DOCUMENTS

GB    2 323 946 A    10/1998

OTHER PUBLICATIONS

Pereira et al. "A relevance feedback Model based on soft consensus Dynamic" Fuzzy Systems, 1997., Proceedings of the Sixth IEEE InternationalConference on, vol.: 3, 1997 pp. 1221–1225 vol. 3.*
Chua et al. "A concept–based Image Retrieval System " System Sciences, 1994. vol. III: InformationSystems: Decision Support and Knowledge–Based Systems.pp. 590–598.*
Benitez et al, "Using Relevance Feedback in content–based Image Metasearch", IEEE Internet Computing, vol.: 2 Issue: 4, Jul.–Aug. 1998 pp.: 59–69.*
Cox et al "PicHunter: Bayesian Relevance Feedback for Image Retrieval" Proceeding of ICPR 1996. pp. 361–369.*
Inoue, S. et al: "Image Filing System Capable of Quick Retrieval," NHK Laboratories Note, No. 328, Feb. 1, 1986.

* cited by examiner

*Primary Examiner*—John Breene
*Assistant Examiner*—Khanh Pham

(57) ABSTRACT

A database containing data items, such as images, text, audio records or video records, in both summary and complete forms, is searched by reference to descriptors associated with the data items, in response to user requests. The search result contains the summary form of the selected items. Responses from users indicative of the utility of the search results (implicit in the users' subsequent actions in requesting the complete forms of specific selected items) are used to refine the descriptors to alter subsequent search results.

28 Claims, 5 Drawing Sheets

0.2 - 0.1

0.3 to migrate up 0.69 - 0.21

0.9 - 0.7

METHODS OF AND APPARATUS FOR REFINING DESCRIPTORS

TECHNICAL FIELD

This invention relates to methods of and apparatus for refining descriptors, for example such as are used for retrieving data items from databases.

BACKGROUND ART

A major obstacle to the efficient retrieval of data is the way they are indexed (i.e. to select descriptors or keywords). Currently there are two common ways of indexing:

1. The use of an automatic indexing tool to extract words from text documents or recognize forms and elements in images, videos, etc. This is based on artificial intelligence (AI) techniques and has the limits that this technology offers.
2. One or more people does the indexing manually after a close analysis of the data This is usually accurate but reliant on the vocabulary of the indexer and their perception of the data (It may be very subjective for images, for instance). It is also time-consuming.

Both of these techniques provide a set of indexing keywords or descriptors which are static, and which very often belong to a vocabulary that is inconsistent and limited. However, people querying the system in effect provide possible keywords in their queries. The keywords in the queries may not be existing descriptors but they are relevant to the data. Currently this information is left unused and forgotten by the system once the user quits the system. As a result, if the indexing keywords are inappropriate, nothing can be done to improve them even if some people may provide good indexing terms as they search.

If the terminology commonly used changes over time (for example, one technical term becomes superseded by another), then it becomes necessary to redo all the indexing which is undesirable, especially as databases become bigger and bigger.

Thus there is a need to describe data so that they will be more easily searchable by the majority of the community.

DISCLOSURE OF INVENTION

According to one aspect of the invention, a method of indexing data items to enable retrieval thereof comprises: (1) storing the data items in a complete form; (2) storing association relationships between the stored data items and descriptors associated with the stored data items; (3) receiving a search request from a user for selection of stored data items, wherein the request incorporates at least one descriptor; (4) sending the user a search result including a summary form of the stored data items selected in accordance with the search request; and (5) modifying the stored association relationship between the stored data items and the stored descriptors in response to the user responding to the sent search result by requesting the complete form of a selected data item in a search result. The modification includes adding and/or removing at least one descriptor to the stored association relationship for the selected data item for which the complete form was requested.

Another aspect of the invention relates to a method of indexing data items in a central facility accessible by plural users, wherein the data items being indexed enable retrieval thereof. The method comprises: (1) storing the data items in a complete form; (2) storing association relationships between the stored data items and descriptors associated with the stored data items; (3) receiving search requests from plural users for selection of stored data items, wherein the requests incorporate at least one descriptor associated with each data item; (4) sending users search results, wherein each search result includes a summary form of the stored data items selected in accordance with the search request; and (5) modifying the stored association relationship between the stored data items and the stored descriptors in response to the user responding to the sent search result by requesting the complete form of a selected data item in a search result. The modification includes adding and/or removing the at least one descriptor to the stored association relationship for the selected data item for which the complete form was requested.

A further aspect of the invention relates to a search facility for retrieving data items in response to user requests, wherein the search facility comprises: (1) a store for (a) the data items and (b) association relationships between the stored data items and descriptors associated with the stored items; (2) a receiver for search requests from users of the search facility, wherein each search request includes a user selection of at least one of the stored data items and at least one descriptor associated with the user selected at least one stored data item; and (3) a processor coupled to the receiver for retrieving from the store the users' search results in response to the search request by the users. The retrieved search results include a summary form of the stored data items selected in accordance with the search request. The processor is arranged for modifying the stored association relationship between the stored data items and the stored descriptors in response to the user responding to the sent search result by requesting the complete form of a selected data item in a search result. The modification includes adding and/or removing the at least one descriptor to the stored association relationship for the selected data item for which the complete form was requested.

BRIEF DESCRIPTION OF DRAWINGS

Methods and apparatus in accordance with this invention for refining descriptors associated with data items will now be described, by way of example, with reference to the accompanying drawings, in which.

BEST MODE FOR CARRYING OUT THE INVENTION, & INDUSTRIAL APPLICABILITY

Figure 1:
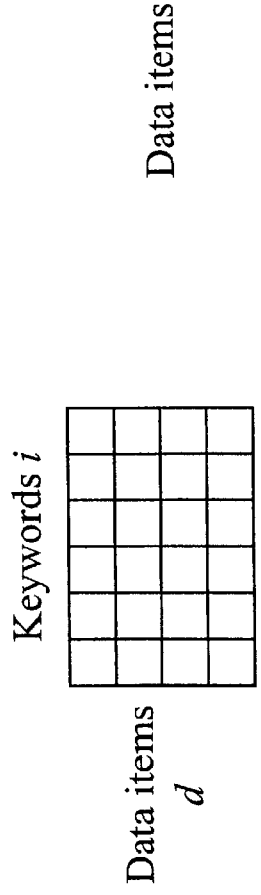

Keywords or descriptors available in a database system to lead a searcher to a particular item (such as a document or image) are often different from the descriptors which best describe the content of that item. This is what makes information retrieval sometimes inaccurate and unsuccessful. In a traditional retrieval system which provides a static index by algorithmic means, the index can be represented by a data item-keyword, sparse matrix M of fixed dimensionality (see FIG. 1). An entry in the matrix M(d, i) is a number and has the meaning "the data item d has been indexed with a keyword i" Binary information or keyword frequencies can be stored and this leads to traditional binary or probabilistic retrieval systems. The main weakness of the static indexing approach is a user-system vocabulary mismatch (need for thesauri, stemming and fuzzy matching) and a need for mapping a user query into the indices that the system uses.

It would be desirable to capture the keywords provided by users while searching, and associate them with the items the users retrieved. In this way it can be ensured that items are usefully associated with the keywords people actually use to retrieve them.

Figure 2:
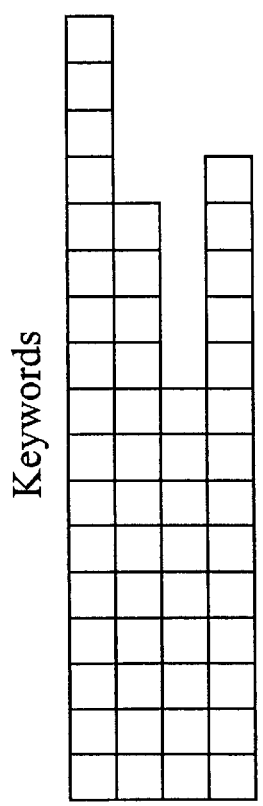
FIGS. 1 and 2 are used in describing different indexing systems.

An example of the invention is referred to herein as adaptive indexing, where the items are indexed by reference to contributions (explicit or implicit) from the entire community as people search the data. With adaptive indexing the system is capable of capturing the keywords entered by the user community. The information captured from the user interaction during the process of searching and browsing the results leads to automatic thesaurus build-up, gradual convergence of the system's keywords to the user population vocabulary and indexes which are always up-to-date. The dynamic index could be visualised as a list of keywords (FIG. 2) with the containing list enumerating all the data items and the contained lists enumerating all the keywords for a given data item. Keywords could also have scores attached to them according to their degree of relevance for a data item. The lists expand when a new keyword is entered.

In this scenario, each item or piece of data has a set of associated dynamic descriptors or keywords, which are not static but which can change with time as a result of information from people searching. Each descriptor for a given piece of data has a weight that measures its relevance to that piece of data. The value of the weight is statistically determined by the searches. At an instant in time, the descriptor with the highest weight at that time is considered to be the best description of the piece of data because it was the most popular description of the piece of data given by people using the system. The descriptor with the smallest weight is not very relevant to the piece of data, and if its weight continues to decrease then at some point the descriptor may be removed (garbage collected).

Feedback from users may be explicit (e.g. users provide comments on how useful or relevant the search result was) or implicit (e.g. a system monitors whether people make purchases in relation to the content of search results). In the example described below with reference to FIGS. 3 and 4 the feedback is implicit, i.e. the user does not know about the learning process going on in the system. Consequently, the system has to evaluate the associations that are implied by the user's actions.

Figure 3:
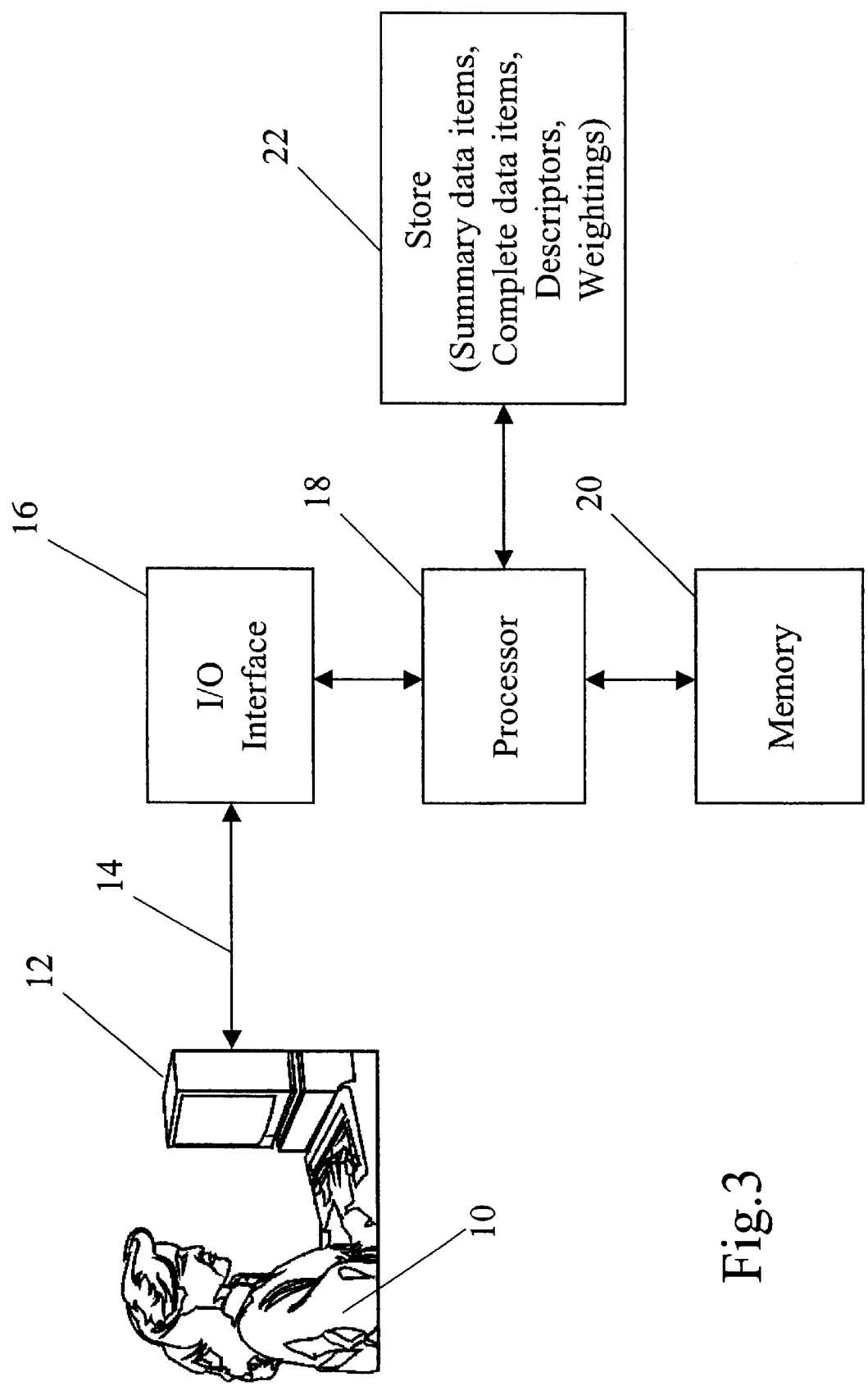
FIG. 3 is a block schematic diagram of a system for implementing the invention.

Referring to FIG. 3, a user 10 operates a computer terminal 12 to send search requests via a communications link 14 (e.g. in a computer communications network) to an input/output interface 16. The interface 16 forwards the search requests to a processor 18 which executes software program instructions stored in a memory 20 to search a store 22 holding data items and associated descriptors for indexing them. The program instructions may include, for example, search engine functions for scanning for data items associated with specified descriptors, and functions for managing the associations with descriptors.

Each data item (document, image, etc.) is held in the store 22 in two different forms:

a "summary form" where it is minimally described so that the user can quickly access its contents. In the case of images, the summary may be a "thumbnail" (a reduced-scale, low resolution version of the full image) with possibly an image title or some other information such as the photographer's or artist's name, or an image reference number. By quickly examining this summary, the user can form an initial opinion on whether this item may be relevant to their query.

a "complete form", which contains all the necessary information about the item to enable a decision to be made on whether it is relevant to the current query or not. For an image, for instance, this complete form would comprise the image at a good enough resolution to enable details of the composition as well as the quality of the image to be assessed. In a remote technical support system it could be the full history of a call for support by a user, and the assistance and advice given (Question/Answer/Comments/Pointers to relevant documents etc . . . ).

The user 10 first provides a query, and the processor 18 responds with a list of summaries of items which appear potentially relevant. The user browses through this result list, and upon finding an item which appears from its summary to be similar to what is being sought, she will access the complete form of that item. The processor 18, under the control of the program in the memory 20, treats this choice as an implicit signal that an association has been made between the initial query (list of descriptors) and that item in the database. Consequently it updates the descriptors of the selected item accordingly in the store 22. All the keywords in the query are associated with the selected item in this updating, irrespective of whether or not hey were already descriptors for that item—this is how the system applies new keywords.

Figure 4:
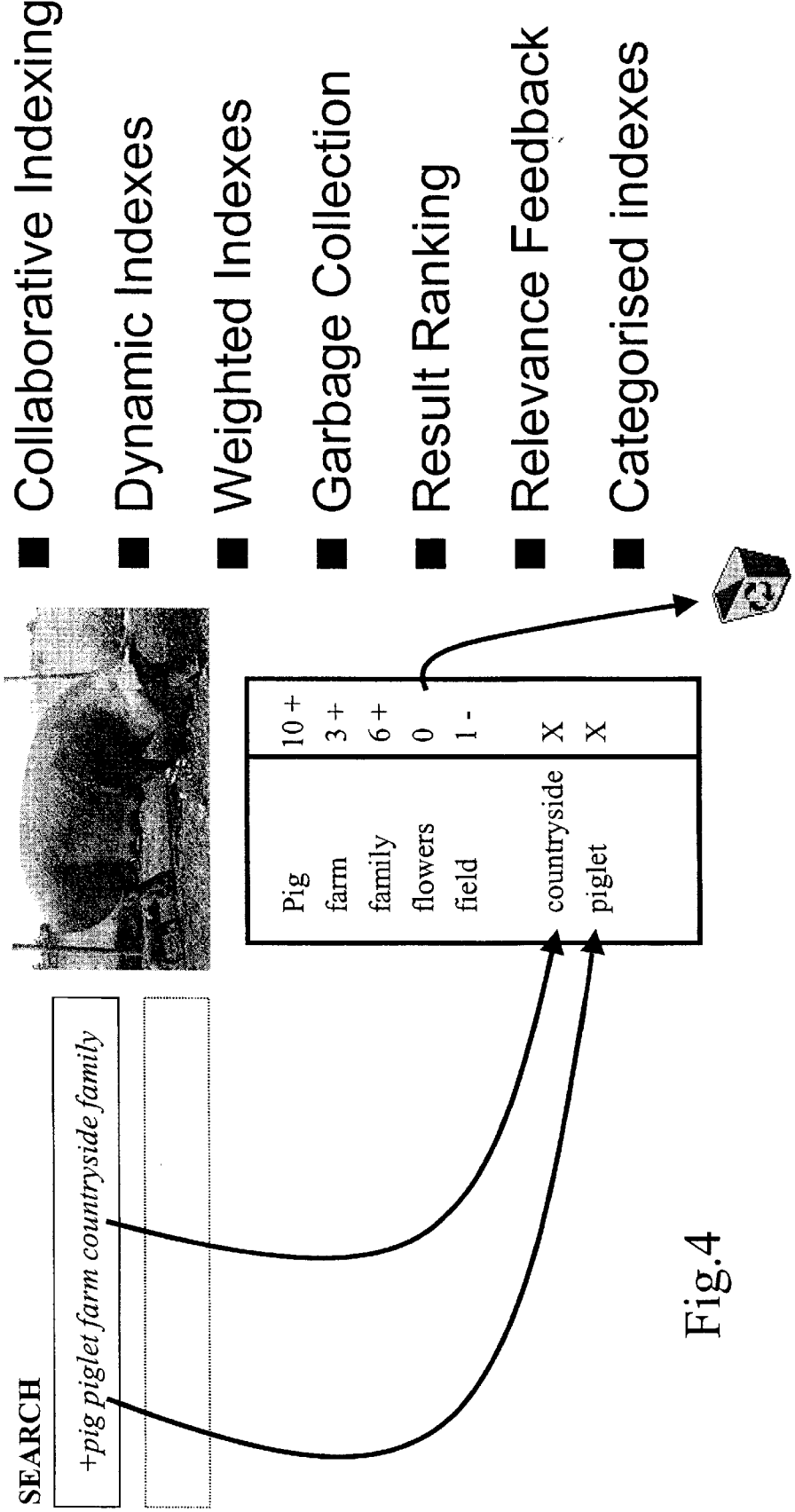
FIG. 4 illustrates adaptive indexing of an image.

Thus, referring to FIG. 4, a picture of a pig with a litter of piglets standing by a cluster of flowers may already be indexed according to the terms pig, farm, family, flowers and field. A user may enter a search query containing the terms pig, piglet, farm, countryside and family. Because countryside and piglet are not already present as descriptors for this picture, the system adds them. It also adjusts (increases) the weighting of the descriptors in the query which are already associated with this item (such as pig and farm). If flowers persists with zero weighting it is eventually removed as a descriptor for this image.

The evolution of the weights of the descriptors for a given data item is tailored by the interactions of the users. The more users associate a descriptor with a particular data item, the higher the resulting weight. If users' description of the data item changes (through, for example, evolution of terminology, historical events, new terminology, a new data domain or a new set of users) the descriptors will evolve according to the majority opinion of the community of users searching the data.

As this technique relies on purely implicit indications, the possibility of some inappropriate associations cannot be avoided. For instance the user 10 may be seeking a picture of a lion eating its prey. She may enter the query "lion eating prey", and the processor 18 returns a picture of an antelope resting in the shadow of a tree. Although the user is not interested in buying rights to use this image she finds it appealing and requests the complete form to see the image in more detail out of pure curiosity. The keyword capture process implemented by the processor 18 will reflect this action by reinforcing or re-indexing this image Of an antelope with the keywords "lion", "eating" and "prey", with "lion" perhaps becoming a new descriptor in the process. It is also possible to make an inappropriate association by associating an item with a misspelled keyword.

However such inappropriate associations should have a minimal impact on die system, because an individual association does not change the keyword weighting very much. A newly associated keyword does not acquire maximal significance immediately after the first association is made. In other words, more than a single association is needed to radically change the indexing; for example, in one implementation, new keywords are not used for search until five associations with that keyword have been made. Consequently a misspelled keyword will become a valid descriptor for the data item only if it is a common misspelling.

So far adaptive indexing has been described essentially as a process happening when access is made to the complete form of a data item for preview/review. However it is also possible to introduce multiple levels of impact on the indexing. For example, it is possible to reinforce the descriptors further if the user 10 decides actually to buy rights to use an image. This is equivalent to adding an extra level of relevance feedback that would be more explicit, and it reduces the potential risks of purely implicit feedback. Explicit feedback could also be introduced at the end of the retrieval phase, especially for remote support systems where customer satisfaction is often monitored.

Each association between a descriptor or keyword and a data item has a weight, which is a value between 0 and 1. This weight may be implemented in either of two ways:

data item focussed: weights are associated with data items and normalisation is done relative to data items; this implies defining how a data item is described;

keyword focussed: weights are associated with keywords and normalisation is done relative to a keyword; this implies defining what a keyword means.

In the present embodiment keyword focussed weighting is used. This is mainly to ensure that specialist keywords which are very rarely used (but which are extremely good descriptors) nonetheless strongly influence the result of a query. If the data item focussed approach were used, the weight of such rarely used keywords would be small compared to the weight of other, more common, keywords. Thus a query combining a common keyword and an unusual keyword would yield a result with many items matching the common keyword, possibly swamping the items matching the unusual though highly relevant descriptor. With the keyword focussed approach the weight of this unusual descriptor is high, as the number of data items described by this specific keyword is small.

This choice has the side effect of giving increased importance to popular data items (as far as the weights are concerned). From a commercial viewpoint this is advantageous; in the case of images, for instance, there are often images which are particularly popular at one time, according to current fashion.

The keyword weight is used to evaluate the importance of a keyword for a particular data item, and also to rank the results of a user query. In the embodiment described herein for each keyword three different weight values are distinguished, which determine the status of that keyword:

$w_k^0$: the initial weight when the keyword first enters the system;

$w_k^{User}$: the threshold for a keyword to become searchable (i.e. be taken into account in determining whether a data item should be included in the result of a user query);

$w_k^{GC}$: the threshold below which a keyword becomes "garbage collected" (i.e. no longer used in assembling results for user queries).

The specific calculation of each of these values depends on the adaptive indexing algorithm adopted.

Further each keyword has a status, determined by these weight values, which reflects the influence of the users as implied by their reactions to query results:

1. Master keyword: the master keyword is provided by the content provider or by a professional indexer (this is the original descriptor). This keyword cannot be removed by the system without the explicit consent of a supervisor. This is because some terms are very specific to the data item, or are even key descriptors, but are not frequently used because the average user (general public) is not familiar with them. Nonetheless their inclusion enables specialists to access the data item quickly.

2. User keyword: this keyword has been provided by a user (general public); it is searchable because a significant number of people have already associated this keyword with a particular data item.

3. Candidate keywords: there are two different types of candidate keyword reflecting two different types of transition for a keyword. In either case they are not "active" (not searchable). They will be garbage collected when their weight falls below a given value ($w_k^{GC}$) or become user keywords if their weight rises above a given value ($w_k^{User}$).

candidate for User keyword: this is the initial status of a new keyword entering the system. This keyword is not yet searchable, because it could be misspelled or an inappropriate association as described above. This status reduces the risk of the search process being slowed by the presence of large numbers of "junk" keywords. However, this also makes the addition of a new keyword harder, as it has to be used in association with an existing keyword for a data item several times before it exceeds the threshold to become a User keyword itself;

candidate for Garbage Collection: this status is reserved for User keywords whose weight decreases to its original introduction weight ($w_k^0$), i.e. they became User keywords but were very rarely used afterwards. This could happen, for example, either by evolution of the vocabulary or by entry of an inappropriate keyword at some point in time.

Figure 5:
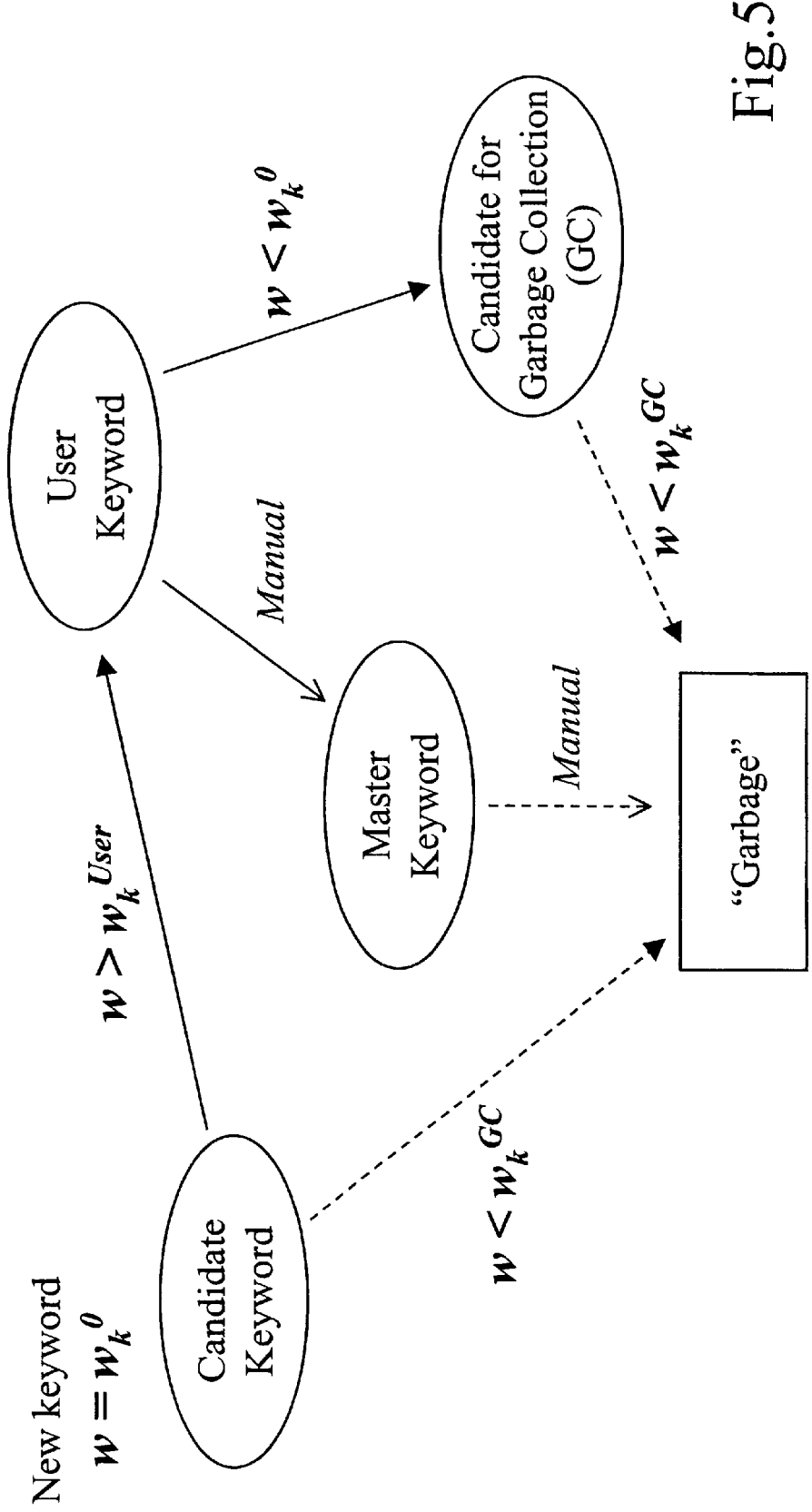
FIG. 5 shows various stages involved in managing inclusion of an item in or omission of that item from a set of descriptors.

FIG. 5 shows the possible transitions between these different possible statuses, and the corresponding values for the weight $w_k^0$ which result in each transition.

Various different techniques for varying the value of the weight $W_k^0$ can be used. Two are described below. The first is a straightforward interpretation of simple probabilistic rules. The second one is more empirical and aims at forcing the weights to evolve following an exponential curve.

In the first technique the weight is fixed for a given period of time. At the end of each period, the weight is re-evaluated according to the extent of association which has occurred during that period. The duration of a period is the only arbitrary parameter. It depends on the total number of data items and on the extent of use of the search system (number of queries per day for instance). At the beginning of each period, for each keyword k, two counters are set to zero:

$C_k$ represents the number of times the keyword has been associated with data items (irrespective of whether it was with different data items or many times with the same data item);

$C_{k,i}$ represents the number of times the keyword has been associated with data item i. At the end of the period, the weight of the association between a keyword and a data item is defined by $w_{k,i} = (C_{k,i}/C_k)$ if $C_k$ is different from 0

$w_{k,i} = 0$ otherwise

In other words, the weight represents the probability that the data item i is indexed by the keyword k. Under these circumstances, the starting weight $w_k^0$ for a new keyword will be proportional to $1/C_k$. The two other thresholds $W_k^{User}$ and $w_k^{GC}$ are arbitrary and will be the same for all the keywords. A disadvantage of this method is that the history associated with a weight is rather limited and very dependent on the activity of the search system, and more specifically on the extent of use of the keyword.

Figure 6:
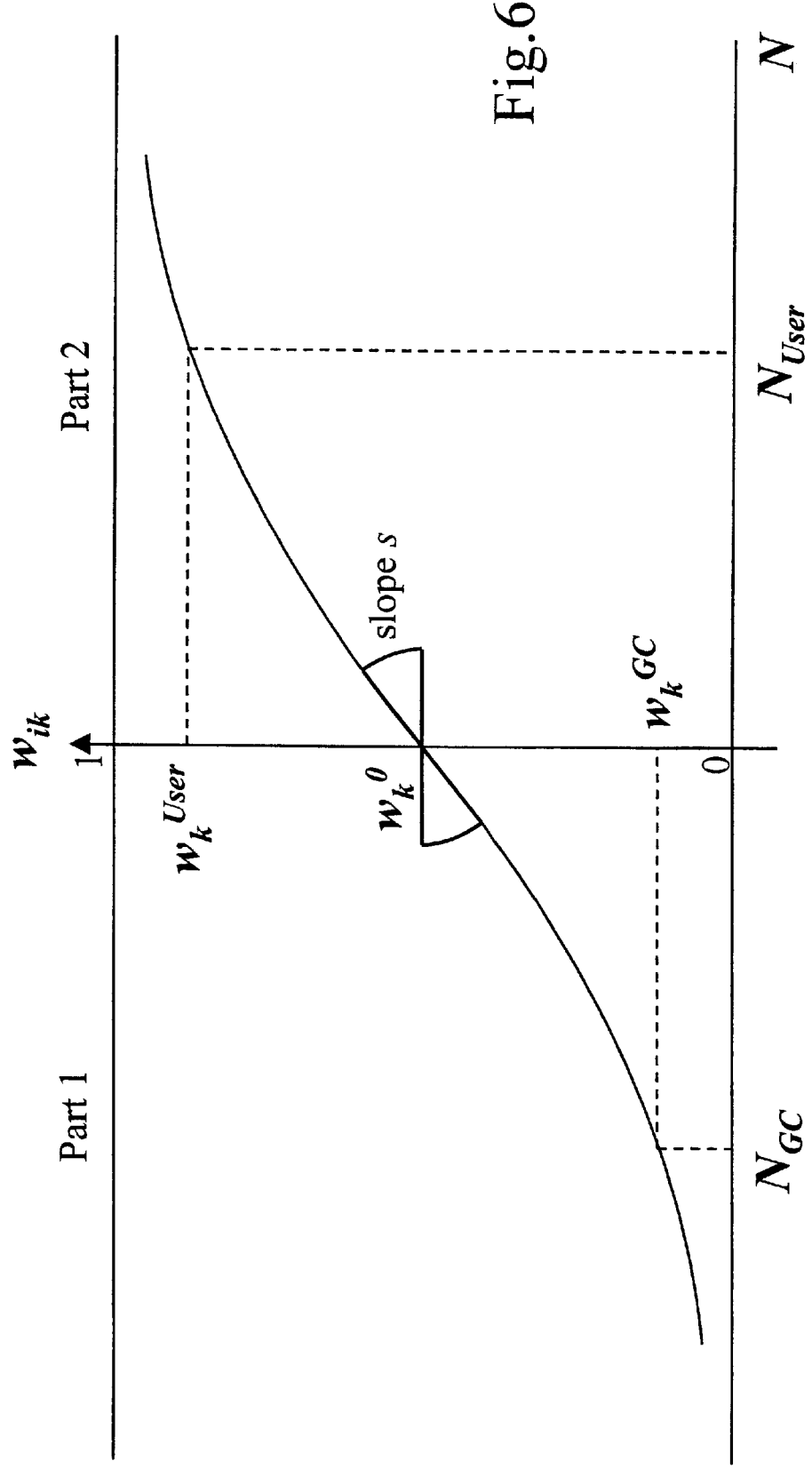
FIG. 6 illustrates operation of a technique for adjusting keyword weights.

The lists of keywords could be sorted according to normalised scores and divided into quantized intervals of fixed length in proportion to each keyword's probability of indexing a data item. Keywords would compete on the basis of weight to be promoted to the higher interval and would be moved down to the lower interval by more appropriate keywords. Conditions can be specified for crossing interval boundaries to prevent keywords oscillating between intervals (see FIG. 6). Keyword probabilities may be quantized to save storage (a byte gives 256 bins of length 0.004 which could be sufficient).

Figure 7:
FIG. 7 shows an exponential function used in deciding weighting factors applied to descriptors.

In the second, exponential function, technique, the weight follows a curve composed of two exponential curves (see FIG. 7). Thus increasing and decreasing the weights is reduced to a simple multiplication by a specific coefficient. Each association of a data item with the same keyword will follow the same curve depending on the initial weight.

For convenience and efficiency of computation it is preferable to store the value $v=w-1$ instead of w itself. Hereinafter v is referred to as the "Relationship Coefficient". In addition the following notations are used:

| | |
|---|---|
| $v_{ik}$: | Relationship Coefficient of association [i,k] |
| $v_k^0$: | Initial Relationship Coefficient for associations with keyword k |
| $v_k^{User}$: | User Relationship Coefficient for associations with keyword k |
| $v_k^{GC}$: | GC Relationship Coefficient for associations with keyword k |
| $n_k$: | Number of data items indexed by keyword k in active associations |

The following requirements can be easily ensured:
  weight limitation to represent a relevancy weight (i.e. $w_{ik} \in ]0,1[$ or $v_{ik} \in ]-1,0[$)
  we can control the number $N_{User}$ of interactions needed for a keyword in an association to become an active keyword (i.e. the total number of associations of the keyword with that data item needed to have $v_{ik} > v_k^{User}$)
  we can control the number $N_{GC}$ of negative interactions needed for a keyword in an association to become an candidate for garbage collection (i.e. the number of associations needed to have $v_{ik} < V_k^0$)
  reversibility of updating (i.e. $v_{ik}$ increased once and decreased $n_k$ times returns to the initial value before the increase)

The weight-updating procedure requires an initial setting for the relationship coefficient. For each association between a keyword and a data item this relationship coefficient will be increased or decreased. In the case of a new association, it will be entered into the store 22, and if this new association is made with a new keyword, this keyword will also be entered into the store 22.

The relationship coefficients for a keyword are first initialized depending on the number of data items indexed by the keyword. It is considered that the more data items one keyword indexes, the less relevant it should initially be to describe the data items. Thus $v_k^0$ can take the form:

$$v_k^0 = \frac{1}{\sqrt{n_k + 2}} - 1$$

For practical reasons it is undesirable for the initial relationship coefficient to be too high, so 2 is added to $n_k$ in the formula. This is arbitrary and different values could be used here.

For each part of the curve (Part 1 and Part 2, FIG. 7) there is a respective increasing coefficient and a decreasing coefficient. These coefficients, as well as the initial relationship coefficient, are specific to each keyword.

Part 2 of the curve: When $v \geq v^0$

If f is the function describing this part, with the two initial conditions $f(0) = v_k^0$ and the slope $f'(0) = s$, the following expression for f is obtained:

$$f(x) = v_k^0 \exp\left(\frac{sx}{v_k^0}\right)$$

Increasing coefficient equation (calculated from f(x+1)):

$$v'_{ik} = C_{inc}^{(2)} \cdot v_{ik} \text{ with } C_{inc}^{(2)} = \exp\left(\frac{s}{v_k^0}\right)$$

Decreasing coefficient equation (calculated from f(x−1/$n_k$)):

$$v''_{ik} = C_{dec}^{(2)} \cdot v_{ik} \text{ with } C_{dec}^{(2)} = \exp\left(\frac{-s}{n_k \cdot v_k^0}\right)$$

Part 1 of the curve: when $v < v^0$

If g is the function describing this part, with the two initial conditions $g(0) = v_k^0$ and the slope $g'(0) = s$, the following expression for g is obtained:

$$g(x) = (v_k^0 + 1)\exp\left(\frac{sx}{v_k^0 + 1}\right) - 1$$

Increasing coefficient equation (calculated from g(x+1)):

$$v'_{ik} = C_{inc}^{(1)} \cdot (v_{ik} + 1) - 1 \text{ with } C_{inc}^{(1)} = \exp\left(\frac{s}{v_k^0 + 1}\right)$$

Decreasing coefficient equation (calculated from g(x−1/$n_k$)):

$$v''_{ik} = C_{dec}^{(1)} \cdot (v_{ik} + 1) - 1 \text{ with } C_{dec}^{(1)} = \exp\left(\frac{-s}{n_k \cdot (v_k^0 + 1)}\right)$$

In FIG. 7 the x axis represents the number N of associations between a keyword and a data item. The exact derivation of N is:

$N = N^+ - N^- 0.1/n_k$ where $N^+$ represents the number of times the association [i,k] was made and $N^-$ the number of times the associations [j,k] were made for $j \neq i$.

The User and GC relationship coefficients are derived as follows: User relationship coefficient $v_k^{User}$ This represents the value of v taken after $N_{user}$ associations have occured, without any decrease, since the association was created (i.e. since v=v⁰).

$$v_k^{User} = v_k^0 \cdot (C_{inc}^{(2)})^{N_{User}}$$

GC relationship coefficient $v_k^{GC}$
This represents the value of v that would take the value of the initial relationship coefficient v⁰, after $N_{GC}$ negative interactions have occurred, without any decrease.

$$v_k^{GC} = v_k^0 \cdot (C_{inc}^{(1)})^{-N_{GC}}$$

The coefficient $n_k$ counts associations with the keyword k that are active, which means that the other coefficients $v_k^0$, $C_{inc}^{(1)}$, $C_{inc}^{(2)}$, $C_{dec}^{(1)}$ and $C_{dec}^{(2)}$ only relate to the active keywords. When the status of a keyword k in an association changes, the value of $n_k$ must be increased (candidate keyword to user keyword) or decreased (user keyword to candidate for GC keyword), Then all the other coefficients must be recalculated.

If a new association is made with a new keyword k, the system should initialise the value of $n_k$ to 1 and then calculate $v_k^0$, $C_{inc}^{(1)}$, $C_{inc}^{(2)}$, $C_{dec}^{(1)}$ and $C_{dec}^{(2)}$. Then the association is created between the data item and the keyword, and $v_{ik}$ gets the relationship coefficient value $v_k^0$.

When a new association is made but with a keyword k already in the system (i.e. indexing other data items), this new association is created and its relationship coefficient is initialised to $v_k^0$. As it is not an active keyword for that data item yet, it is not counted in $n_k$, so the other coefficients are not yet recalculated.

Some example scenarios incorporating the present invention will now be briefly described:
1) Indexing new data items: a batch of photographs has to be added to the image repository and there exists a community of picture indexers (these could be the users browsing the collection). Each indexer is given a randomly selected picture from the new batch and is asked to provide the keywords. These are added to the keyword set indexing the picture or if the keyword is already present the counter associated with it is incremented. Provided that users agree on a subset of keywords for a given picture, these would eventually emerge with the higher score.
2) Searching an indexed collection of data items: the collection of photographs is being searched with keywords by a large user community. The candidate photographs selected in accordance with the keywords are shown in thumbnail form, and once a thumbnail image is selected for viewing of the complete version at full size and resolution the search keywords modify existing indices by a small factor (learning rate). If the user subsequently chooses to purchase a copy of the image, the association of the search keywords with the image may accordingly be strengthened further. One could try to obtain the thesaurus automatically assuming that two subsequently entered keywords are related semantically (assuming keywords are nouns only). This is a very weak assumption and most of the pairs would constitute "noise" (i.e. they have a very small probability of being entered by another user) but consistently entered keyword pairs would emerge through the scoring procedure.

Many applications for adaptive indexing exist. The World Wide Web provides one particularly attractive opportunity, since its user community is huge and diverse. People use the Web to search for information of any type and are sensitive to delays in the search so the quality of indexing is very important. The Web also changes very quickly as technologies evolve: there is a need for a maximum of dynamism as well as availability of the information.

Adaptive indexing might also be very useful for smaller user communities. A corporate user community can for instance train the search tool to use their own specialized vocabulary. Since the indexing is adaptive, the indexes can be specific or dedicated to a particular area.

This system would be extremely useful for image libraries, since automatic tools to index images are very difficult to produce. The way that we describe an image is also dependent on what we take into account in the image: it may be the elements which go into its composition, or the emotion that it provokes, for instance. An adaptive indexing tool will build a set of descriptors which reflect what the majority of people searching the image library think about an image, making it easily retrievable by this majority.

On one hand therefore this technique may be used to index the Web and make a data item easily reachable by a majority of people searching for it, and on the other hand it allows the use of a very restricted vocabulary for indexing in a small user community with rigid rules. The system adapts itself to the environment and can be moved smoothly from one environment to another.

In fact, this system tries to capture real life perception of objects in the environment. We all have different ways of describing something but the description that is most often used in the appropriate community can be considered as the democratic description. Thus an adaptive indexing system can act as a repository for human knowledge, and taking "snapshots" of the state of the system from time to time could allow cultures to be compared over time.

Although the system can adapt its indexes automatically without intervention, there is also the possibility that a manager of the system can set some parameters in accordance with the search capabilities needed:
modification of the number of descriptors for the data By modifying the threshold of the minimum weight or the total number of descriptors allowed, one can decide who wide the vocabulary will be.
modification of the amplitude of the weight: the manager can choose whether it is appropriate to have weights which are very close together or far apart. This has to do with the strategy for training the system when a new vocabulary has to be built up, such as in the initial phase, or just after some event such as change of user community which is likely to bring in a significant number of new descriptors and make some of the old descriptors obsolete. We could start with weights close together so that links can be made easily between pieces of data and new descriptors, and later make the weights further apart as the vocabulary for the description stabilizes.

What is claimed is:

1. A method of indexing data items to enable retrieval thereof, comprising the steps of:
storing said data items in a complete form,
storing association relationships between said stored data items and descriptors associated with said stored data items;
receiving a search request from a user for selection of stored data items, said request incorporating at least one descriptor;
sending the user a search result including a summary form of the stored data items selected in accordance with the search request; and modifying the stored association relationship between the stored data items and the stored descriptors in response to the user responding to the sent search result by requesting the complete form of a selected data item in a search result, the modification including adding at least one descriptor to the stored association relationship for the selected data item for which the complete form was requested or removing said at least one descriptor from the stored association relationship for the selected data item for which the complete form was requested.

2. The method of claim 1, wherein the user's responses that cause the modification include explicit comments supplied by the user indicative of the usefulness of search results.

3. The method of claim 1, wherein the stored data items include representations of images and the summary form of the stored data item including a representation of an image includes a thumbnail version of the image.

4. The method of claim 1, wherein the association relationship for a selected data item is modified in response to the user making a monetary transaction in connection with a thing associated with the selected data item.

5. The method of claim 1, wherein the association relationship between one of said stored data items and one or more of said stored descriptors has for each of said one or more of said descriptors a stored weight indicating a strength of association between the stored data item and the stored descriptor.

6. The method of claim 5, wherein modification to the association relationships further comprises modifying the stored weights in said stored association relationships.

7. The method of claim 6, wherein a descriptor not previously present in the stored association relationship for a data item is assigned a first weight in response to the descriptor initially occurring in a search request from a user.

8. The method of claim 6, wherein a descriptor is added to the stored association relationship in response to the weight for that descriptor exceeding a threshold value.

9. The method of claim 6, wherein a descriptor is removed from the stored association relationship in response to the weight falling below a threshold value.

10. The method of claim 6, wherein a descriptor is added to the stored association relationship in response to the weight for that descriptor exceeding a first threshold value and a descriptor is removed from the stored association relationship in response to the weight falling below a second threshold value.

11. The method of claim 1, wherein said at least one of the stored descriptors is modified by being added to the stored association relationship for the selected data item for which the complete form was requested and said at least one of the descriptors is modified by being removed from the stored association relationship for the selected data item for which the complete form was requested.

12. A method of indexing data items in a central facility accessible by a plurality of users, the data items being indexed to enable retrieval thereof, comprising the steps of:
storing said data items in a complete form;
storing association relationships between said stored data items and descriptors associated with said stored data items;
receiving search requests from a plurality of users for selection of stored data items, said requests incorporating at least one descriptor associated with each data item;
sending users search results, each search result including a summary form of the stored data items selected in accordance with the search request; and
modifying the stored association relationship between the stored data items and the stored descriptors in response to the user responding to the sent search result by requesting the complete form of a selected data item in a search result, the modification including adding said at least one descriptor to the stored association relationship for the selected data item for which the complete form was requested or removing said at least one descriptor from the stored association relationship for the selected data item for which the complete form was requested.

13. The method of claim 12, wherein said at least one of the stored descriptors is modified by being added to the stored association relationship for the selected data item for which the complete form was requested and said at least one of the descriptors is modified by being removed from the stored association relationship for the selected data item for which the complete form was requested.

14. A search facility for retrieving data items in response to user requests, the search facility comprising
a store for (a) the data items and (b) association relationships between the stored data items and descriptors associated with the stored items,
a receiver for search requests from users of the search facility, each search request including a user selection of at least one of the stored data items and at least one descriptor associated with the user selected at least one stored data item,
a processor coupled to the receiver for retrieving from the store the users' search results in response to the search request by the users, the retrieved search results including a summary form of the stored data items selected in accordance with the search request, the processor being arranged for modifying the stored association relationship between the stored data items and the stored descriptors in response to the user responding to the sent search result by requesting the complete form of a selected data item in a search result, the modification including adding said at least one descriptor to the stored association relationship for the selected data item for which the complete form was requested or removing said at least one descriptor from the stored association relationship for the selected data item for which the complete form was requested.

15. The search facility of claim 14, wherein responses by the users include explicit comments supplied by the user indicative of the usefulness of search results, the processor being arranged to modify the descriptors in response to the explicit comments indicative of the usefulness of the search results.

16. The search facility of claim 14, wherein responses by the users include a monetary transaction in connection with a commodity associated with a selected data item, the processor being arranged to modify the descriptors in response to the response including the monetary transaction.

17. The search facility of claim 14, wherein the stored association relationship between one of said stored data items and one or more of said descriptors has for each of said one or more of said descriptors a stored weight indicating strength of association between the stored data item and the stored descriptor.

18. The search facility of claim 17, wherein the processor is arranged for modifying the stored association relationships by modifying the stored weights in said association relationships.

19. The search facility of claim 18, wherein the processor is arranged for assigning a first weight for the stored association relationship for a data item in response to the descriptor initially occurring in a search request from a user.

20. The search facility of claim 18, wherein the processor is arranged for adding a description to the stored association relationship in response to the weight for that descriptor exceeding a threshold value.

21. The search facility of claim 18, wherein the processor is arranged for removing a descriptor from the stored association relationship in response to the weight for that descriptor falling below a second threshold value.

22. The search facility of claim 14, wherein the processor is arranged for modifying said at least one of the stored descriptors by (a) adding the descriptor to the stored relationship for the selected data item for which the complete form was completed and (b) removing the descriptor from the stored relationship for the selected data item for which the complete form was completed.

23. A method of indexing data items to enable retrieval thereof, comprising the steps of:
    storing said data items in a complete form,
    storing association relationships between said stored data items and descriptors associated with said stored data items;
    receiving a search request from a user for selection of stored data items, said request incorporating at least one descriptor;
    sending the user a search result, including a summary form of the stored data items selected in accordance with the search request; and
    modifying the stored association relationship between the stored data items and the stored descriptors in response to the user responding to the sent search result by requesting the complete form of a selected data item in a search result, the modification including removing at least one descriptor from the stored association relationship for the selected data item for which the complete form was requested.

24. A method of indexing data items to enable retrieval thereof, comprising the steps of:
    storing said data items in a complete form,
    storing association relationships between said stored data items and descriptors associated with said stored data items;
    receiving a search request from a user for selection of stored data items, said request incorporating at least one descriptor;
    sending the user a search result including a summary form of the stored data items selected in accordance with the search request; and
    modifying the stored association relationship between the stored data items and the stored descriptors in response to the user responding to the sent search result by requesting the complete form of a selected data item in a search result, the modification including adding at least one descriptor to the stored association relationship for the selected data item for which the complete form was requested.

25. A method of indexing data items in a central facility accessible by a plurality of users, the data items being indexed to enable retrieval thereof, comprising the steps of:
    storing said data items in a complete form;
    storing association relationships between said stored data items and descriptors associated with said stored data items;
    receiving search requests from a plurality of users for selection of stored data items, said requests incorporating at least one descriptor associated with each data item;
    sending users search results, each search result including a summary form of the stored data items selected in accordance with the search request; and
    modifying the stored association relationship between the stored data items and the stored descriptors in response to the user responding to the sent search result by requesting the complete form of a selected data item in a search result, the modification including removing at least one descriptor from the stored association relationship for the selected data item for which the complete form was requested.

26. A method of indexing data items in a central facility accessible by a plurality of users, the data items being indexed to enable retrieval thereof, comprising the steps of:
    storing said data items in a complete form;
    storing association relationships between said stored data items and descriptors associated with said stored data items;
    receiving search requests from a plurality of users for selection of stored data items, said requests incorporating at least one descriptor associated with each data item;
    sending users search results, each search result including a summary form of the stored data items selected in accordance with the search request; and
    modifying the stored association relationship between the stored data items and the stored descriptors in response to the user responding to the sent search result by requesting the complete form of a selected data item in a search result, the modification including adding said at least one descriptor to the stored association relationship for the selected data item for which the complete form was requested.

27. A search facility for retrieving data items in response to user requests, the search facility comprising
    a store for (a) the data items and (b) association relationships between the stored data items and descriptors associated with the stored items,
    a receiver for search requests from users of the search facility, each search request including a user selection of at least one of the stored data items and at least one descriptor associated with the user selected at least one stored data item,
    a processor coupled to the receiver for retrieving from the store the users' search results in response to the search request by the users, the retrieved search results including a summary form of the stored data items selected in accordance with the search request, the processor being arranged for modifying the stored association relationship between the stored data items and the stored descriptors in response to the user responding to the sent search result by requesting the complete form of a selected data item in a search result, the modification including removing said at least one descriptor from the stored association relationship for the selected data item for which the complete form was requested.

28. A search facility for retrieving data items in response to user requests, the search facility comprising
    a store for (a) the data items and (b) association relationships between the stored data items and descriptors associated with the stored items,
    a receiver for search requests from users of the search facility, each search request including a user selection of at least one of the stored data items and at least one descriptor associated with the user selected at least one stored data item, a processor coupled to the receiver for retrieving from the store the users' search results in response to the search request by the users, the retrieved search results including a summary form of the stored data items selected in accordance with the search request, the processor being arranged for modifying the stored association relationship between the stored data items and the stored descriptors in response to the user responding to the sent search result by requesting the complete form of a selected data item in a search result, the modification including adding said at least one descriptor to the stored association relationship for the selected data item for which the complete form was requested.

* * * * *